UNITED STATES PATENT OFFICE.

ADOLF BAEYER, OF MUNICH, BAVARIA, ASSIGNOR TO BADISCHE ANILIN AND SODA FABRIK, OF MANNHEIM, GERMANY.

PROCESS OF MANUFACTURE OF INDIGO-BLUE.

SPECIFICATION forming part of Letters Patent No. 259,260, dated June 6, 1882.

Application filed May 8, 1882. (No specimens.)

*To all whom it may concern:*

Be it known that I, ADOLF BAEYER, a subject of the King of Bavaria, residing at Munich, in the Kingdom of Bavaria and German Empire, have invented new and useful Improvements in the Manufacture of Artificial Indigo-Blue, of which the following is a specification.

This invention relates to the production of an artificial indigo-blue from orthonitrophenylpropiolic acid by first converting said orthonitrophenylpropiolic acid into an ether compound—such as its ethylic ether—then converting this ether compound into indogenic ether, then treating such indogenic ether with caustic alkalies, followed by muriatic acid, and finally exposing the product obtained to an oxidizing action.

In carrying out my invention I take an ether compound of orthonitrophenylpropiolic acid—such, for instance, as the ethylic ether of the said acid—and I treat the same with a cold solution of an ammonium sulph-hydrate until no further reaction is observed to take place, or until a sample of the insoluble portion of the product ceases to dissolve in concentrated sulphuric acid with an orange-red color. The solid part of the mass thus obtained is filtered off and washed and then exhausted by repeated treatment with a cold and dilute solution of caustic soda. The alkaline extract thus obtained is acidified with muriatic acid, whereby indogenic ether is precipitated. In order to convert the said indogenic ether into indogenic acid, I treat the former with hot and concentrated caustic alkalies, in which treatment I proceed as follows: I take from three to five parts, by weight, of caustic soda, and add so much water that the mixture has a fusing-point of 160° to 180° centigrade. To this mixture I gradually add one part, by weight, of the indogenic ether, and keep the whole mass at a temperature of from 160° to 180° centigrade, stirring it well all the time until the fusing process is completed, or until no longer any alcoholic vapors are evolved. I then allow the mass to cool and introduce the same, in small portions at a time, into an excess of cold muriatic acid. In this manner a precipitate of indogenic acid is obtained, which may be collected on a filter, washed, and dried. By exposing the indogenic acid to an oxidizing action it becomes converted into artificial indigo-blue. For this purpose the indogenic acid may be dissolved in a weak alkaline solution or exposed to ammoniacal vapors while the atmospheric air has free access to it, or the oxidation may be effected by means of acid oxidizers, such as acid solutions of the perchlorides of iron or copper, or of bichromate of potash.

What I claim as new, and desire to secure by Letters Patent, is—

The within-described process of producing artificial indigo-blue by first producing an ether compound of orthonitrophenylpropiolic acid, then converting this ether compound into indogenic ether, then treating such indogenic ether with caustic alkalies, followed by muriatic acid, and finally exposing the product obtained to an oxidizing action, substantially as set forth.

In testimony whereof I have hereunto set my hand and seal in the presence of two subscribing witnesses.

ADOLF BAEYER. [L. S.]

Witnesses:
LUDWIG LUNDBURG,
ADOLF SPIEGEL.